United States Patent
Chu et al.

(10) Patent No.: US 7,812,839 B2
(45) Date of Patent: Oct. 12, 2010

(54) METHOD FOR CREATING 3-D CURVED SUFACE BY USING CORRESPONDING CURVES IN A PLURALITY OF IMAGES

(75) Inventors: Chang Woo Chu, Taejon (KR); Jae Chul Kim, Taejon (KR); In Kyu Park, Seoul (KR); Bon Ki Koo, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 538 days.

(21) Appl. No.: 11/634,996

(22) Filed: Dec. 7, 2006

(65) Prior Publication Data

US 2007/0132763 A1    Jun. 14, 2007

(30) Foreign Application Priority Data

Dec. 8, 2005    (KR) .............. 10-2005-0119846
Oct. 16, 2006   (KR) .............. 10-2006-0100463

(51) Int. Cl.
    *G06T 11/20* (2006.01)
(52) U.S. Cl. ............ 345/442; 345/419; 345/420; 345/441; 345/443; 345/469; 348/169; 382/154
(58) Field of Classification Search ........... 345/419, 345/420, 442, 441, 443, 469, 629; 382/154; 348/169
    See application file for complete search history.

(56) References Cited

U.S. PATENT DOCUMENTS

| | | | |
|---|---|---|---|
| 6,937,235 B2 * | 8/2005 | Fujiwara et al. ........ | 345/420 |
| 7,271,377 B2 * | 9/2007 | Mueller et al. ........ | 250/208.1 |
| 7,626,589 B2 * | 12/2009 | Berger ............... | 345/582 |
| 2005/0140670 A1 | 6/2005 | Wu et al. | |
| 2006/0017720 A1 * | 1/2006 | Li .................. | 345/419 |
| 2006/0056695 A1 * | 3/2006 | Wu et al. ............ | 382/173 |

OTHER PUBLICATIONS

Seitz et al. "Photorealistic Scene Reconstruction by Voxel Coloring", Journal of Computer Vision, vol. 35, No. 2, 1999, pp. 32.

* cited by examiner

*Primary Examiner*—Kimbinh T Nguyen
(74) *Attorney, Agent, or Firm*—Lowe Hauptman Ham & Berner LLP

(57) ABSTRACT

Provided is a method for creating a 3-D curved surface by using corresponding curves in a plurality of images. The method includes performing an NURBS fitting curve with respect to one image in a plurality of images having camera calibration and extracted camera parameter by using control points designated in a curve characterizing a subject shape. When the curve fitting is performed with respect to the curve that commonly exists in more than two images, a 3-D curve is created by using a camera calibration information, or a 3-D curved surface is created by creating a plurality of 3-D curves or straight lines. Therefore, a 3-D curved surface model can be easily and quickly created by simplifying a complex modeling process for an actual object modeling into an actual image-based modeling process.

8 Claims, 7 Drawing Sheets

METHOD FOR CREATING 3-D CURVED SUFACE BY USING CORRESPONDING CURVES IN A PLURALITY OF IMAGES

BACKGROUND OF THE INVENTION

1. Field of the Invention

The present invention relates to a method for creating 3-D curved surface by using corresponding curves in a plurality of images, and more particularly, to a method for creating 3-D curved surface by using corresponding curves in a plurality of images, which creates a curved surface model in non-uniform rational b-splines (NURBS) by obtaining more than two object images, designating corresponding curve through a convenient curve designation, and restoring 3-D information through a convenient operation of a user to model a complex curved surface object.

2. Description of the Related Art

To extract 3-D information from images, provided is a conventional technique such as a shape-from-stereo technique, a shape-from-multiple views technique, a shape-from-motion technique, etc. The shape-from-stereo automatically or manually searches correspondence between images of characteristic points in each image, and calculates distance from a camera to a 3-D point by trigonometry that utilizes calibration information of each camera.

In the shape-from-multiple views, a shape-from silhouette technique, a voxel coloring technique, and a space carving technique have been developed. The shape-from silhouette technique cuts down space formed of voxel by using silhouette information with respect to an object image having a distinguishable background and object. The voxel coloring technique determines whether an object is formed of voxel or not by checking color correspondence when a specific voxel is projected as an image. The space carving technique generalizes the shape-from silhouette technique and the voxel coloring technique.

The shape-from-motion technique traces specific points from a continuous moving image in frames, and then restores 3-D information by performing camera self-calibration with the specific points.

To perform these techniques, camera calibration needs to be accurate and correspondence between images in specific points needs to be accurately obtained.

In most of cases, due to a camera calibration error, a correspondence error in specific points, and a 3-D information error restored by form concavity, it is difficult to create accurate a 3-D model. Additionally, since the 3-D information created by the result of these techniques is point information, additional post-processing algorithm is required to create a soft 3-D curved surface that constitutes the surface of an actual object by using the point information.

SUMMARY OF THE INVENTION

Accordingly, the present invention is directed to a method for creating 3-D curved surface by using corresponding curves in a plurality of images, which substantially obviates one or more problems due to limitations and disadvantages of the related art.

It is an object of the present invention to provide a method for creating 3-D curved surface by using corresponding curves in a plurality of images. The method can easily and quickly create a 3-D curved surface model from an actual curved surface form by using curve designation and camera calibration information with respect to an obtained actual object in images to create 3-D curves and curved surfaces.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
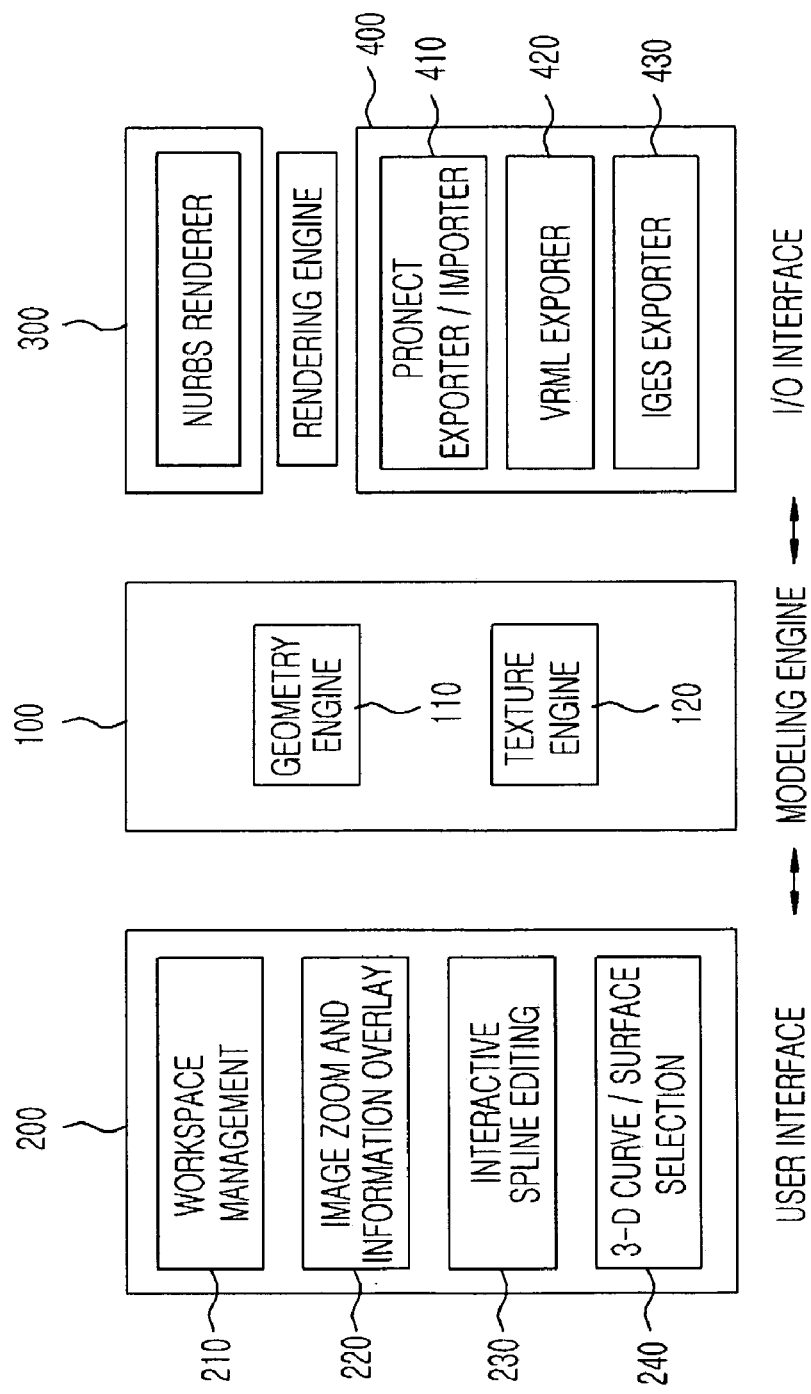
FIG. 1 is a control block diagram of an image-based curved surface modeling tool according an embodiment of the present invention.

FIG. 1 is a control block diagram of an image-based curved surface modeling tool according an embodiment of the present invention.

Referring to FIG. 1, a 3-D curved surface creating tool includes a modeling engine 100, a user interface 200, a rendering engine 300, and an I/O interface 400.

The modeling engine 100 includes a geometry engine 110 calculating a geometric structure such as a 3-D curve, a 3-D curved surface, etc. based on a command that is inputted through the user interface 200, and a texture engine 120 that extracts a text.

The user interface 200 visualizes an image obtained by a user in a monitor. The user interface 200 includes a workspace management 210 performing division and designation in a workspace, an image zoom and information overlay 220 enlarging or reducing an image or overlaying information, an interactive spline editing 230 displaying data and points to create a 3-D curve, and a 3-D curve/surface selection 240 creating a bilinear surface and as surface of revolution by using the created 3-D curve.

Here, the interactive spline editing 230 adds the proper number of data points for a curve form that a user would like to create and creates an approximating NURBS curve in real time. At this point, since the data points can be added, deleted, and moved, the final curve that the user wants is created by changing the shape of the approximating NURBS curve. The approximating curve in each image is created as a 3-D curve by using camera calibration information. At this point, the camera calibration information is obtained in advance and is an input of the method in the present invention. A method for obtaining the camera calibration information is not a scope of the present invention. Any conventional methods can be utilized and includes a 3×4 camera matrix and a 3×3 fundamental matrix.

The rendering engine 300 includes an NURBS renderer 310 visualizing the created 3-D curve and curved surface.

The I/O interface 400 includes a project export/import 410, a virtual reality modeling language (VRML) for compatibility with other graphic tools, a VRML exporter 420 outputting in an initial graphic exchange system (IGES) file format, and an IGES exporter 430.

A method for creating 3-D curved surface by using corresponding curves in a plurality of images will be described in more detail with reference to FIGS. 2 to 7.

Figure 2:
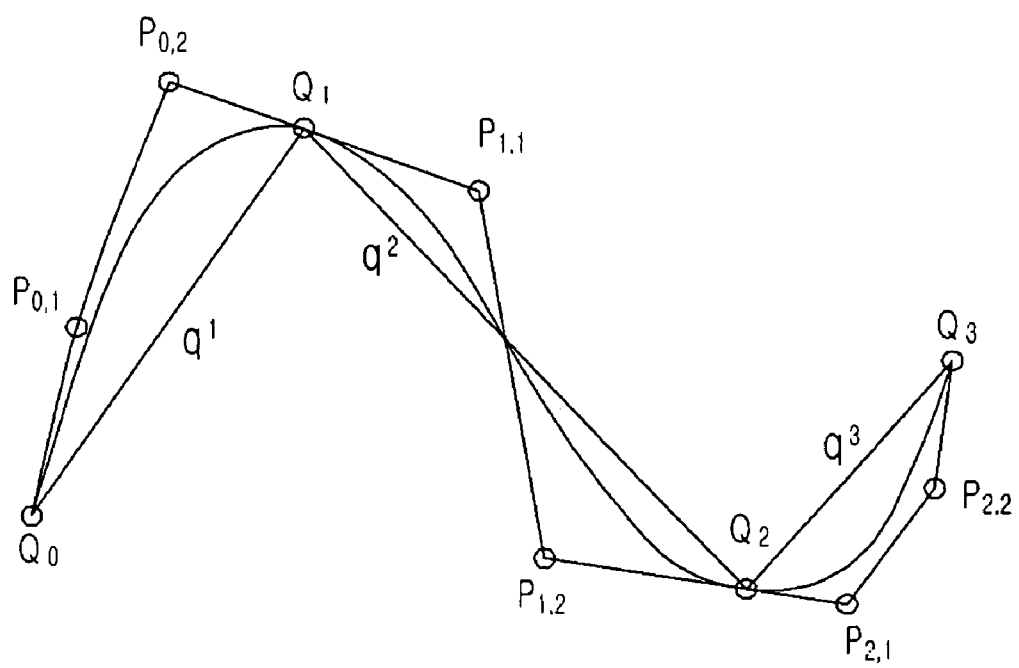
FIG. 2 is a view of 10 control points and a 3-D NURBS curve created from the 10 control points according to an embodiment of the present invention.

FIG. 2 is a view of 10 control points and a 3-D NURBS curve created from the 10 control points according to an embodiment of the present invention.

Referring to FIG. 2, four points Q.sub.0, Q.sub.1, Q.sub.2, and Q.sub.3 are data points that a user designates. The four points $Q_0$, $Q_1$, $Q_2$ and $Q_3$ as well as $P_{0,1}$, $P_{0,2}$, $P_{1,1}$, $P_{1,2}$, $P_{2,1}$ and $P_{2,2}$ are control points of the created cubic NURBS curve, and a second order differential curve is created from the created 10 control points. At this point, the curve form can be changed by adjusting position of $Q_0$, $Q_1$, $Q_2$ and $Q_3$.

A process of creating a 3-D curve model will be described in more detail.

First, when a user request an existing project contents or creates a new project through the project exporter/importer 410, a workspace is created by the workspace management 210, and an image is displayed to the user by the image zoom and information overlay 220.

Accordingly, the user designates points Qs along a curve that characterizes subject form captured in an image by using the interactive spline editing 230. The designated points Qs are overlayed on the image by the image zoom and information overlay 220, and then is displayed to the user. At this point, the user can move and delete the designated points, and add new points by the interactive spline editing 230. Additionally, the user can designate the beginning and end of the curve. When the number of points that the user designates is more than two, a soft 2-D NURBS curve is created by using the points that the user designates and the points that the geometry engine 110 designates. The image zoom and information overlay 220 overlays the curve on the image. A method for creating a 2-D NURBS curve includes conventional well-known various methods. In this embodiment, the method for creating a 2-D NURBS curve utilizes a local bicubic curve interpolation in which the point that a user designates has a local influence. The detailed method is as follows.

A tangent vector $T_k$ in $\{Q_k\}$, k=0 . . . n, which is a set having a n number of points, is expressed in Equation (1):

$$T_k = \frac{V_k}{|V_k|} V_k = (1-\alpha_k)q_k + \alpha_k q_{k+1} \quad (1)$$

$\alpha_k$ in Equation (1) is an interpolation element, and expressed as follows.

$$\alpha_k = \frac{|q_{k-1} \times q_k|}{|q_{k-1} \times q_k| + |q_{k+1} \times q_{k+2}|}$$

$P_0$ and $P_3$ are two end points in a 3-D Bezier curve. When assuming that $T_0$ and $T_3$ are a tangential direction that has a unit length corresponding to the end points, a Bezier curve C(u), u∈[0,1] can be created. Here, $P_1$ and $P_2$ are expressed as follows.

$$P_1 = P_0 + \frac{1}{3}\alpha T_0 \quad P_2 = P_3 - \frac{1}{3}\alpha T_3$$

α is calculated as follows.

$$(16-|T_0+T_3|^2)\alpha^2 + (12(P_3-P_0)\cdot(T_0-T_3))\alpha - 36|P_3-P_0|^2 = 0$$

Using these methods, a local bicubic curve interpolation is performed by obtaining a Bezier curve $C_k(u)$ between $Q_k$ and $Q_{k+1}$ in $\{Q_k\}$, $_{k=}0 \ldots n$ points that a user inputs. As a result, an NURBS curve can be obtained, in which the control point is $Q_0$, $P_{0,1}$, $P_{0,2}$, $P_{1,1}$, $P_{1,2}$, . . . , $P_{n-2,2}$, $P_{n-1,1}$, $P_{n-1,2}$, $Q_n$ and a knot vector is $$U = \left\{0, 0, 0, 0, \frac{u_1}{u_n}, \frac{u_1}{u_n}, \frac{u_2}{u_n}, \frac{u_2}{u_n}, \ldots, \frac{u_{n-1}}{u_n}, \frac{u_{n-1}}{u_n}, \ldots, 1, 1, 1, 1\right\}$$

A user performs curve fitting with respect to curves that commonly exist in more than two images, and a 3-D curve is created by using camera calibration information. At this point, when designating points in an image after the second time, the geometry engine 110 calculates a line (an epipolar line) that is expected to have points by using camera calibration information, and then the image zoom and information overlay 220 overlays the line on the image for displaying.

At this point, the epipolar line can be calculated by multiplying a 3×3 fundamental matrix by control point coordinates that a user designates in an initial image. This is a conventional method introduced in "Multiple View Geometry in Computer Vision, Second Edition (2003)" by Richard Hartley.

A 3-D restored curve is selected by the 3-D curve/surface selection 240, and then a 3-D curved surface is created using the selected curve. A conventional method for creating a 3-D curved surface utilizes a bilinear surface, a ruled surface, a generalized cylinder, a surface of revolution, a skinned surface, a swept surface, and a boundary patch.

A text is put on the restored 3-D curved surface by the texture engine 120. The text can be created by blending couple of images designated by the user, and can be selectively extracted by considering an object viewing angle and a normal vector of a curved surface.

The 3-D restored curve and curved surface are displayed to the user three-dimensionally.

The completed 3-D curved surface model can be stored in a file, which can be recognized in a commercial computer graphic software, by the VRML exporter 420 and the IGES exporter 430.

Figure 3:
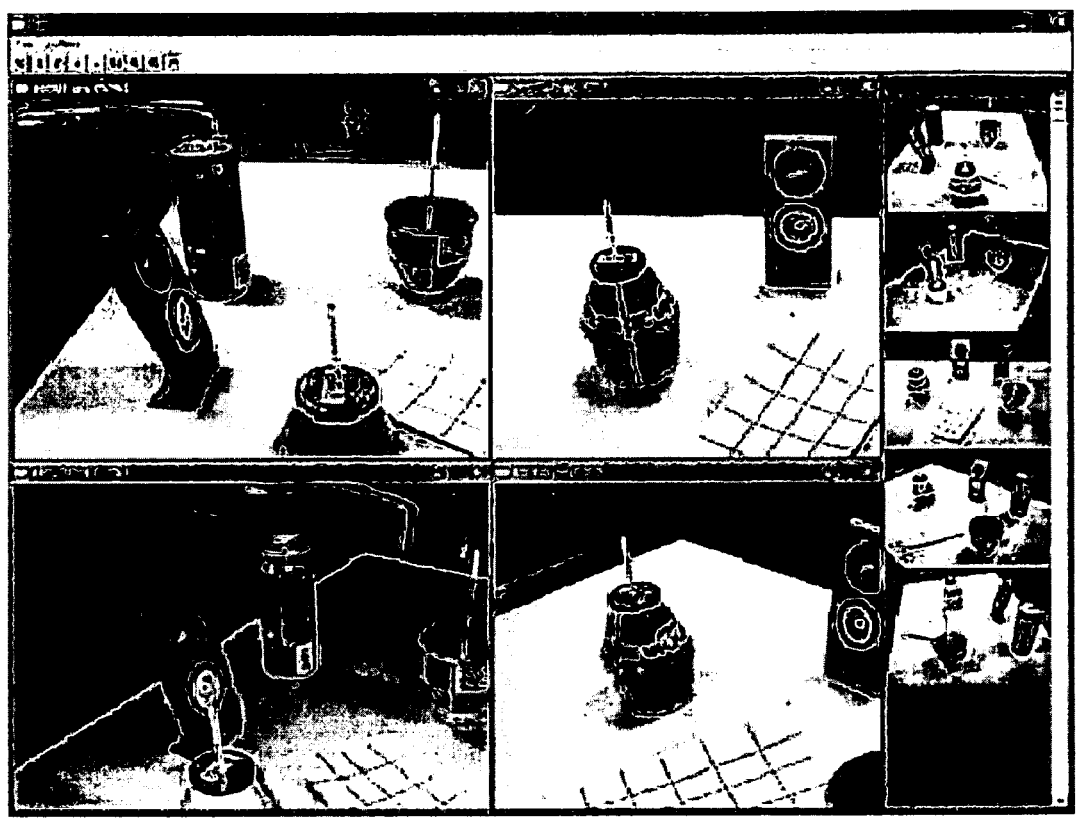
FIG. 3 is a screen shot of an initial image in an image-based curved surface modeling tool according to an embodiment of the present invention.

FIG. 3 is a screen shot of an initial image in an image-based curved surface modeling tool according to an embodiment of the present invention.

Referring to FIG. 3, there are five images such as a cup, a can, a clock, etc. formed of a curved surface, which are obtained from respectively different point of views.

Figure 4:
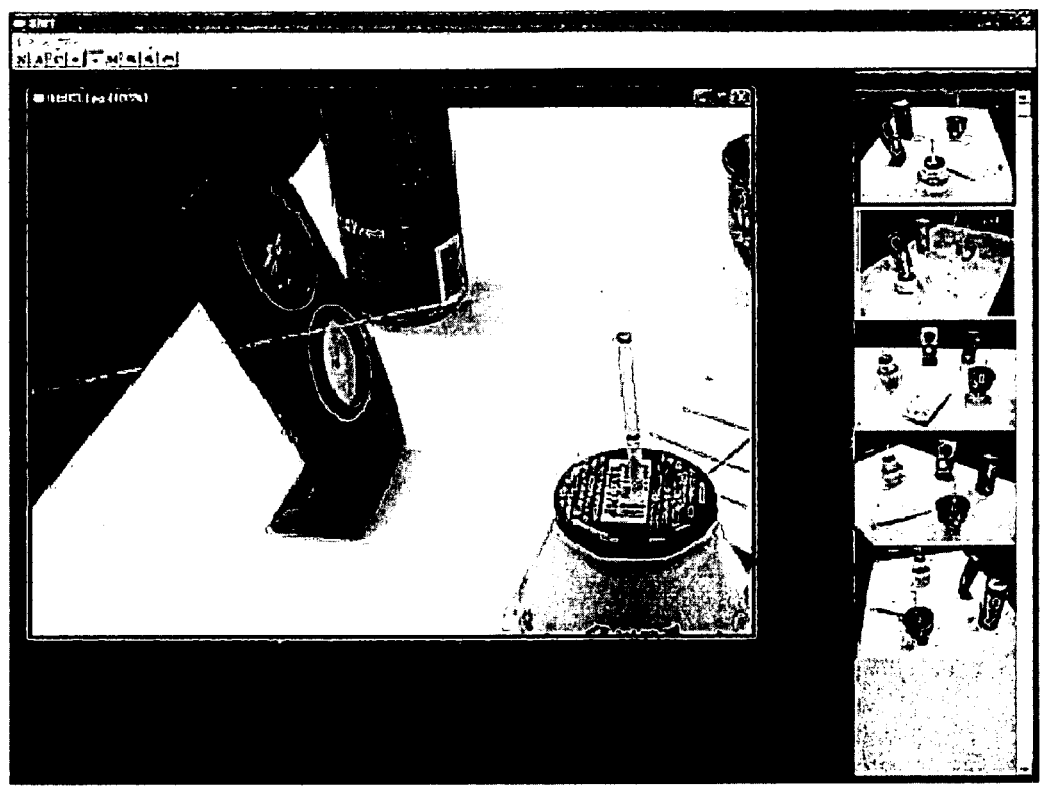
FIG. 4 is a screen shot approximating a profile curve of a clock into an NURBS curve when 10 points are added.

FIG. 4 is a screen shot approximating a profile curve of a clock into an NURBS curve when 10 points are added.

Referring to FIG. 4, 10 control points approximates the profile curve of the clock. The epipolar line of a reference image is displayed simultaneously to easily determine correspondence points.

Figure 5:
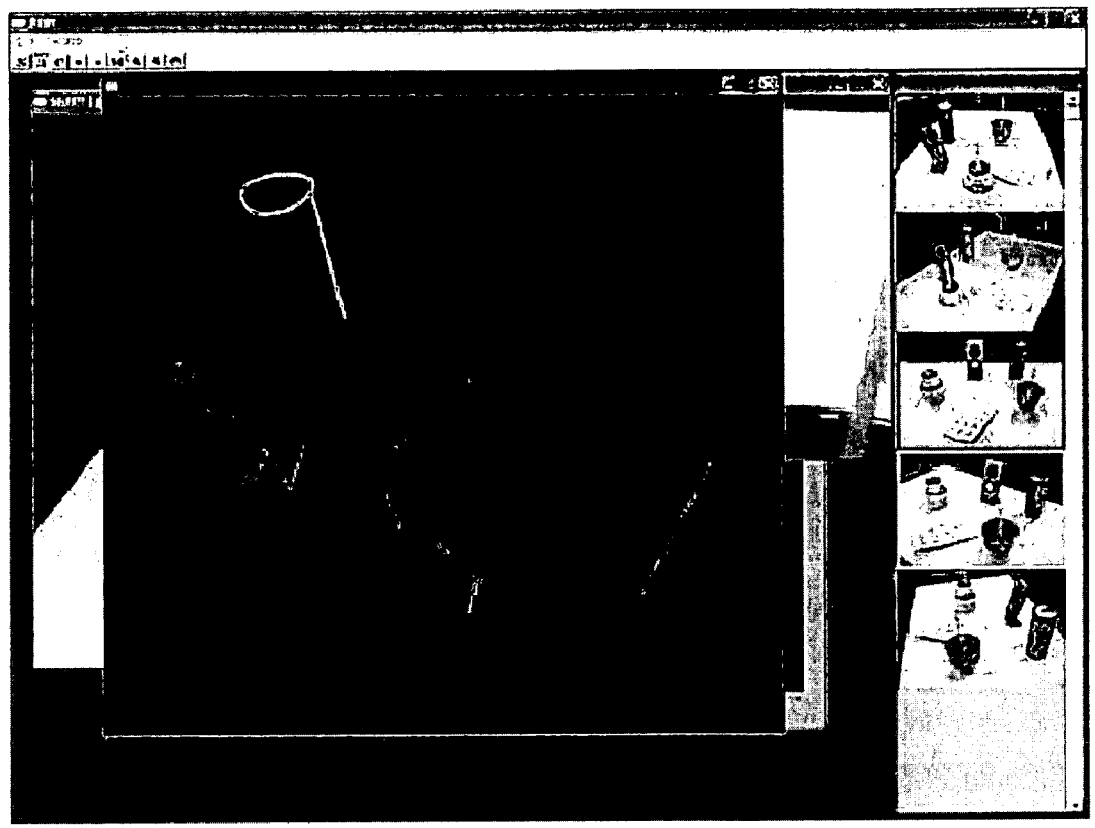
FIG. 5 is a screen shot of a 3-D restoration after curve fitting is performed on curve forms in images.

FIG. 5 is a screen shot of a 3-D restoration after curve fitting is performed on curve forms in images.

Referring to FIG. 5, curve and straight line characteristics of objects such as a cup, a can, a clock, a milk container, etc. in the image are stored in a plurality of images, and then the result that is restored into a 3-D curve by using the characteristics is displayed. The curve and straight line includes 3-D coordinates and a 3-D curved surface is created by using the 3-D coordinates.

Figure 6:
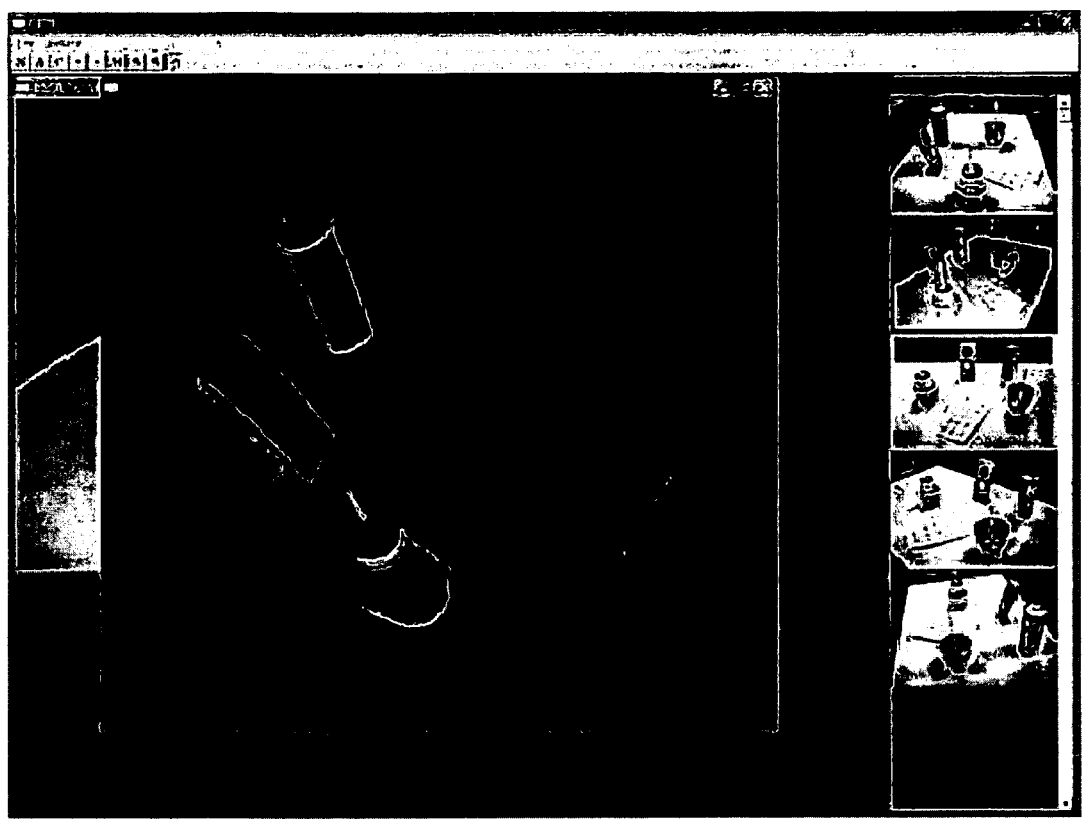
FIG. 6 is a screen shot of a generalized cylinder, a bilinear surface, and a surface of revolution in an image-based curved surface modeling tool.

FIG. 6 is a screen shot of a generalized cylinder, a bilinear surface, and a surface of revolution in an image-based curved surface modeling tool.

The result of creating a curved surface from the restored 3-D curve and straight line characteristics is illustrated in FIG. 6. The can and the clock are modeled with a generalized cylinder, the bent paper is modeled with a bilinear surface, and the milk container is modeled with a surface of revolution.

Figure 7:
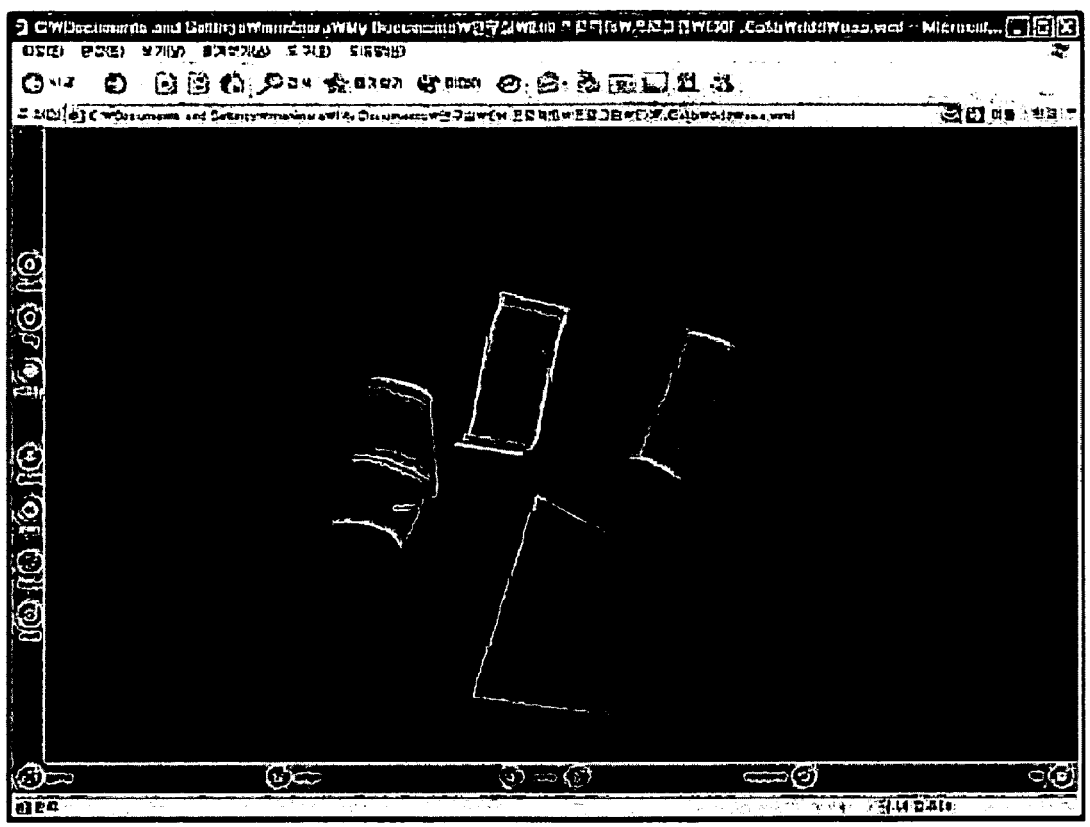
FIG. 7 is a screen shot of VRML models in a VRML visualizing tool.

FIG. 7 is a screen shot of VRML models in a VRML visualizing tool.

Referring to FIG. 7, the restored 3-D curved surface model is divided in a form of mesh model (tesselation), is outputted in a virtual reality modeling language (VRML) format, and then is displayed by using a VRML visualizing tool. The created curved surface can be compatible with other tools.

Referring to FIGS. 2 to 6, a 3-D NURBS curved surface model can be created with a simple operation of a user by using a plurality of images that are obtained from a form having curved surface characteristics. The 3-D NURBS curved surface model can be compatible with other programs such as computer-aided design (CAD) and graphic software.

As described above, a 3-D curved surface model can be easily and quickly created by simplifying a complex modeling process for an actual object modeling into an actual image-based modeling process.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of creating a 3-D surface of a realistic physical subject, the method comprising:
   capturing a plurality of photos of the realistic physical subject in respectively different positions with camera calibration, said photos including a first photo and second photos other than the first photo;
   the method further comprising the following steps being performed by an image-based curved surface modeling tool in interactions with user input:
   (a) performing a NURBS (non-uniform rational b-spline) curve fitting with respect to the subject on the first photo by using control points designated in a curve characterizing a shape of the subject;
   (b) performing a curve fitting with respect to the subject on each of the second photos, by using the control points and camera calibration information of each said second photo;
   (c) creating a 3-D curve by using the control points of each of the photos and camera calibration information of the corresponding photo; and
   (d) creating the 3-D surface by designating the 3-D curve created in the step (c);
   wherein the step (a) includes
      displaying the first photo on a monitor of the tool;
      receiving user input that designates at least some of the control points on the curve characterizing the shape of the subject in the first photo being displayed; and
      displaying the NURBS fitting curve, with the control points, over the first photo being displayed for facilitating user edit of the control points.

2. The method of claim 1, wherein the control points in the step (a) comprises data points creating a second order differential curve.

3. The method of claim 1, wherein the step (b) comprises:
   simultaneously displaying, side-by-side and together with the first photo, at least one photo among the second photos on the monitor;
   estimating a virtual curve with respect to the subject in the displayed second photo by using the camera calibration information of the displayed second photo;
   overlaying the virtual curve on the subject in the displayed second photo;
   overlaying the control points designated with respect to the virtual curve on the subject in the displayed second photo; and
   performing a NURBS curve fitting with respect to the control points by using a geometry engine.

4. The method of claim 3, further comprising:
   adding, deleting or moving one or more of the control points on one of the photos.

5. The method of claim 3, wherein
   one or more of the control points overlaid on the subject in the displayed second photo change in correspondence to adding, deleting, or moving of the corresponding one or more of the control points overlaid on the subject in said first photo.

6. The method of claim 1, wherein, in the step (d), the 3-D surface is created with respect to the 3-D curve by using one of a bilinear surface, a ruled surface, a generalized cylinder, a surface of revolution, a skinned surface, a swept surface, and a boundary patch.

7. The method of claim 1, wherein the 3-D surface is created exclusively based on the photos of the subject and user designation or edit of the control points, without requiring actual access to the physical subject.

8. The method of claim 3, wherein the virtual curve is an epipolar line.

* * * * *